Patented Dec. 1, 1936

2,062,366

UNITED STATES PATENT OFFICE 2,062,366

ASPHALTS OF LOW SUSCEPTIBILITY TO TEMPERATURE CHANGE

Charles Mack, Sarnia, Ontario, Canada, assignor to Standard Oil Development Company, a corporation of Delaware No Drawing. Application July 14, 1934, Serial No. 735,200

2 Claims. (Cl. 196—74)

This invention relates to the manufacture of asphalts from petroleum residuum and particularly to asphalts of low susceptibility to temperature change.

Asphalt, according to J. Marcusson "Die natuerlichen und kuenstlichen Asphalte" Leipzig 1931, is mainly composed of three groups of compounds: oily constituents, asphaltic resins, and asphaltenes. The oily constituents are hydrocarbons and generally contain small percentages of sulfur and oxygen. They appear as a viscous oil similar to cylinder oil and are usually fluorescent. Asphaltic resins represent the intermediate products formed in the transformation of oily constituents into asphaltenes by oxidation with air. They are solid with a softening point of 100° C. or higher. They vary from reddish to dark brown in color. Asphaltenes are formed from asphaltic resins by further action of sulfur or oxygen. They appear as a dark brown to black powder. On heating they do not melt but swell. The specific gravity is higher than one. They are soluble in benzene, chloroform and carbon tetrachloride, and insoluble in ether, petroleum ether and alcohol.

An object of this invention is to treat crude oil residues in order to lower the resin content and to blend the asphalt of low resin content thereby obtained with asphalts of high resin content to prepare asphalts of low susceptibility to temperature change.

Asphalts of low susceptibility are often required as indicated by high penetrations for a given softening point. With actual refinery operations it is impossible to produce asphalts of these characteristics from residues of high susceptibility or from cracking coil tar.

The susceptibility to temperature change is generally calculated by the following formula:

$$\text{Susceptibility factor} = \frac{\text{Penetration 100 gms. 5 sec. @ 100° F.}}{\text{Penetration 100 gms. 5 sec. @ 77° F.}}$$

This formula has been adopted by the board of estimate and apportionment of the city of New York for the department of purchase, in determining the susceptibility factor which was required to have maximum value of 3.25 for asphalt joint filler for stone block pavements.

According to this invention it has been found that asphalts of low susceptibility to temperature change can be obtained by the following method, i. e. by oxidizing a crude oil residue to a high softening point and then mixing it with a low softening point residue to the desired softening point. In oxidizing the crude oil residue to a high softening point the resin content is first increased and then as the oxidation progresses the ratio of resins to oily constituents decreases as may be seen from the following data:

| Asphalt | Resin content of the petrolenes |
|---|---|
| | Percent |
| Illinois flash coil residue 78° F. S. P | 23.3 |
| Illinois flash coil residue 78° F. S. P. oxidized to 130° F. S. P | 35.4 |
| Illinois flash coil residue 78° F. S. P. oxidized to 220° F. S. P | 29.4 |
| Illinois flash coil residue 78° F. S. P. oxidized to 320° F. S. P | 18.0 |

It has been found that the susceptibility of asphalt depends on the resin content and that the asphalts, which are oxidized to such a degree that the resin content is not over about 20%, are mostly adapted for use in this method. These highly oxidized asphalts are readily miscible with the other residues obtained from petroleum oils.

For the determination of the different constituents the Marcusson method has been used in a slightly modified form. The amount of carbenes, carboids and asphaltic acids is very low in asphalts from crude oil, and their determination may be neglected in this case. In order to determine the resin content of asphalts, the asphaltenes are first separated from the asphalt by the general method, i. e. using 86° naphtha. To free the asphaltenes from adsorbed resins, they are dissolved in a small quantity of benzene and then precipitated by an excess of naphtha. This procedure is repeated until the filtrate is colorless. The combined extracts from the asphaltenes are evaporated to a small volume, distributed over at least 500% of adsorptive clay, calculated on the amount of asphalt, and extracted in a Soxhlet apparatus by means of 86° naphtha. This extract should have a yellow color. If it is darker in color, it is extracted again from a larger quantity of clay. This extract contains the oily constituents and the resins remain adsorbed by the clay. The amount of resins is calculated by difference, i. e. by subtracting the percentages of the asphaltenes and oil constituents from 100.

To illustrate, the following comparisons of mixtures prepared according to this invention are made with asphalt oxidized from the residues to the same softening point of the mixtures:

| Mixture | Softening point (Ring & Ball) | Penetration 100 grs. 5 sec. | | |
|---|---|---|---|---|
| | | @ 32° F. | @ 77° F. | @ 100° F. |
| | °F. | | | |
| 25% oxid. Illinois 320° F. S. P.<br>75% Illinois flash coil residue 98° F. S. P. | 129½ | 8 | 73 | 221 |
| 25% oxid. Colombian 318° F. S. P.<br>75% Colombian flash coil residue 105° F. S. P. | 133 | 8 | 64 | 168 |
| 25% oxid. Quire Quire 295° F. S. P.<br>75% Quire Quire flash coil residue 103° F. S. P. | 128 | 4 | 49 | 175 |

| Type of residue | Softening point of oxid. asphalt (Ring & Ball) | Penetration 100 grs. 5 sec. | | |
|---|---|---|---|---|
| | | @ 32° F. | @ 77° F. | @ 100° F. |
| | °F. | | | |
| Illinois flash coil residue 98° F. S. P. | 129½ | 7 | 62 | 193 |
| Colombian flash coil residue 105° F. S. P. | 133 | 7 | 54 | 150 |
| Quire Quire flash coil residue 103° F. S. P. | 128 | 3 | 39 | 160 |

This method also can be applied to material of very high susceptibility as cracking coil tar, preferentially when mixed with a high softening point asphalt oxidized from a crude oil residue:

| Mixture | Softening point (Ring & Ball) | Penetration 100 grs. 5 sec. | | |
|---|---|---|---|---|
| | | @ 32° F. | @ 77° F. | @ 100° F. |
| | °F. | | | |
| 35% oxid. Illinois 320° F. S. P.<br>65% cracking coil tar 101° F. S. P. | 120½ | 6½ | 83 | 290 |
| 35% oxid. Illinois 320° F. S. P.<br>65% cracking coil tar 106° F. S. P. | 126 | 5 | 66 | 275 |

With respect to the penetration at 77° F. for the softening point, these mixtures correspond to Illinois asphalts oxidized from a 101° F. S. P. base, viz.:

Illinois flash coil residue 101° F. S. P. oxid. to 121° F. S. P.
Penetration 100 grs. 5 sec. @ 32° F. 7½, @ 77° F. 83, @ 100° F. 280

Illinois flash coil residue 101° F. S. P. oxid. to 126° F. S. P.
Penetration 100 grs. 5 sec. @ 32° F. 7, @ 77° F. 65, @ 100° F. 210

To further illustrate the resin content of highly oxidized asphalts, a table showing the composition of various asphalts is as follows:

| Source | Softening point (Ring & Ball) | Asphaltenes | Resins | Oily const. |
|---|---|---|---|---|
| | °F. | Percent | Percent | Percent |
| Illinois flash coil residue 78° F. S. P. oxid. to | 320 | 41.1 | 10.6 | 48.3 |
| Colombian flash coil residue 180/220 Pen. oxid. to | 318 | 38.3 | 13.5 | 48.2 |
| Mexican flash coil residue 180/220 Pen. oxid. to | 312 | 48.0 | 10.1 | 41.9 |
| Quire Quire flash coil residue 180/220 Pen. oxid. to | 295 | 45.0 | 7.8 | 47.2 |
| Phenol extract 475° flash point oxid. to | 297 | 47.6 | 3.1 | 49.3 |

Phenol extract is the oil obtained by the use of the preferential solvent phenol to separate the aromatics and unsaturated hydrocarbons from a high boiling point fraction of petroleum oil, such as cylinder stock.

The difference in the resin content of asphalts oxidized and blended to the same softening points may be seen from the following data:

| | Resin content of residue | Resin content of highly oxid. asphalt |
|---|---|---|
| | Percent | Percent |
| Illinois | 35.1 | 10.6 |
| Colombian | 22.4 | 13.5 |
| Quire Quire | 26.0 | 7.8 |

The resin content of blends composed of 75% of residue and 25% of highly oxidized asphalt can be calculated from the above figures. The results thus obtained compare with asphalts from the same source, prepared by oxidation of the crude oil residue to the same softening point, as follows:

| | Resin content of blended asphalts | Resin content of oxid. asphalts (of same S. P. as blend) |
|---|---|---|
| | Percent | Percent |
| Illinois | 28.98 | 35.8 |
| Colombian | 20.18 | 29.9 |
| Quire Quire | 21.45 | 28.5 |

From the above tables it is readily seen that asphalts obtained from the same source of varying softening points and resin content may be blended, or asphalts from different sources may also be blended in order to obtain asphalts of low resin content and thereby of low susceptibility to temperature change.

Inasmuch as the above description and examples have been given merely for the sake of illustration and not for the purpose of limiting the invention thereto, it is intended to claim all inherent novelty in the invention as broadly as the prior art permits.

I claim:

1. Method of producing improved asphalts of low susceptibility to temperature change comprising reducing an asphalt containing crude to a residue solid at ordinary temperature, withdrawing a portion of reduced product, blowing the same to a softening point of the order of about 370° F. and a resin content of not over about 20%, continuing the distilling of the initial residue to obtain a product having a softening point of the order of about 100° F., recovering the heavy oil distillate, and then blending the oxidized residue in minor proportion with a major proportion of the unblown residue to produce a final blended product.

2. Method of producing an improved asphalt of low susceptibility to temperature change comprising producing a primary asphalt residue with a softening point of the order of 78° F. by distillation of an asphalt containing crude, blowing this primary residue to a softening point of the order of about 370° F. and a resin content of less than 20%, preparing a secondary asphaltic residue by distilling an asphalt containing crude to a softening point of about 100° F. collecting the residue, and blending this with a minor proportion of the blown residue.

CHARLES MACK.